# United States Patent [19]

Miura

[11] Patent Number: 5,036,885
[45] Date of Patent: Aug. 6, 1991

[54] ELECTROMAGNETIC VALVE

[75] Inventor: Yasushi Miura, Nagoya, Japan

[73] Assignee: Aisin Seiki Kabushiki Kaisha, Kariya, Japan

[21] Appl. No.: 567,954

[22] Filed: Aug. 15, 1990

[30] Foreign Application Priority Data

Sep. 11, 1989 [JP] Japan ................................. 1-106339

[51] Int. Cl.$^5$ ..................... F15B 13/044; F16K 31/06
[52] U.S. Cl. ............................. 137/625.65; 251/129.15
[58] Field of Search ................ 137/625.65; 251/129.15

[56] References Cited

U.S. PATENT DOCUMENTS

| 4,524,947 | 6/1985 | Barnes et al. | 251/129.15 X |
| 4,548,383 | 10/1985 | Wolfges | 137/625.65 X |
| 4,655,254 | 4/1987 | Hafner et al. | 137/625.65 |
| 4,722,364 | 2/1988 | Kubach et al. | 137/628.65 |
| 4,744,389 | 5/1988 | Ichihashi | 137/625.65 |

FOREIGN PATENT DOCUMENTS

| 0254483 | 1/1988 | European Pat. Off. | 137/625.65 |
| 2727491 | 1/1979 | Fed. Rep. of Germany | 137/625.65 |
| 571651 | 10/1977 | U.S.S.R. | 137/625.65 |
| 2186349 | 8/1987 | United Kingdom | 137/625.65 |

*Primary Examiner*—Gerald A. Michalsky
*Attorney, Agent, or Firm*—Oblon, Spivak, McClelland, Maier & Neustadt

[57] ABSTRACT

An electromagnetic valve has an electromagnetic coil, a main body arranged adjacent to the coil, a fixed core arranged inside of the coil, and a movable core arranged inside of the coil and beside the fixed core such that a space exists between the movable and fixed cores. A cylindrical sleeve is arranged on a side surface of the main body and a cylindrical spool valve is arranged in an inner portion of the cylindrical sleeve such that the spool valve forms a step portion. A gap communicates with the space between the movable and fixed cores, while at least one opening in the body of the spool valve communicates the interior of the spool valve with the step portion. An intermediate plate in the form of an annular plate with a plurality of radial grooves can be arranged between the main body and the sleeve.

3 Claims, 1 Drawing Sheet

ELECTROMAGNETIC VALVE

BACKGROUND OF THE INVENTION

1. Field of the Invention

The present invention relates generally to an electromagnetic valve apparatus. More particularly, the present invention is concerned with an improved structure to remove foreign matter and to establish quick response for an electromagnetic valve apparatus.

2. Description of the Related Art

An electromagnetic valve is often used in, for example, a hydraulic control circuit for controlling a hydraulic flow. A conventional electromagnetic valve is disclosed in FIG. 2. Referring now to the FIG. 2, the electromagnetic valve basically includes a main body 50, a holder 51, a coil 52, a core 53 and a spool valve 54. The spool valve 54 is comprised of a spool 54a and a spool cylinder 54b. A spring 55 is arranged between the spool 54a and the core 53. A spring adjuster 56 is connected with the core 53 via a threaded portion 56a. The set tension of the spring 55 can be varied by turning the spring adjuster 56.

A cylindrical body 57 is fixed to the main body 50. The core 53 is connected to the cylindrical body 57, and the core 53 is fixed to the main body 50. The coil 52 is arranged on the outer surface of the cylindrical body 57 via a coil bobbin 52a. The core 53, the spring adjuster 56, the spring 55, the cylindrical body 57, the coil bobbin 52a and the coil 52 are accommodated in the holder 51. The main body 50 is tightly fitted with the holder 51 and cylindrical body 57. The main body 50 has a cylindrical portion 50a. An inlet port 58 and an outlet port 59 are forming in the cylindrical portion 50a of the main body 50. The spool cylinder 54b is slidably arranged at the inner portion of the cylindrical portion 50a. A hole 60 is formed on the surface of the spool cylinder 54b. The spool valve 54 is slidably connected with the inner portion of the cylindrical portion 50a of the main body 50. The spool 54a and the spool cylinder 54b are tightly connected to each other.

In operation, an electrical signal is applied to the coil 52. This energizes the electromagnetic valve and moves the spool valve 54 to the open position, which is to the right in FIG. 2. As a result, the inlet port 58 and the outlet port 59 communicate with the drain port 61. When the electrical signal is removed, the coil 52 is deenergized, and the spring 55 operates to close the valve by moving the spool valve to the left direction in FIG. 2.

However, there are problems with the above-described design. For example, foreign matter may enter into the spool valve 54 and jam it into either the open or closed position. Even if the valve is not jammed, its operation may be slowed by such foreign matter.

SUMMARY OF THE INVENTION

Accordingly, it is one of the primary objects of the present invention to provide an electromagnetic valve which prevents a foreign matter from entering therein.

It is another object of the present invention to provide an electromagnetic valve with a fast response.

It is still further object of this invention to produce an electromagnetic valve to solve the above described drawbacks of the conventional electromagnetic valve.

Other objects, advantages and novel features of the present invention will become apparent from the following detailed description of the invention when considered in connection with the accompanying drawings.

To achieve the above objects, and in accordance with the principles of the invention as embodied and broadly described herein, an electromagnetic valve comprising, an electromagnetic oil, a main body arranged adjacent to the electromagnetic coil, a fixed core arranged inside of the electromagnetic coil, a movable core arranged inside the electromagnetic coil and beside the fixed core such that a space exists between the movable and fixed cores, a cylindrical sleeve arranged on a side surface of the main body, a cylindrical spool valve arranged in an inner portion of the cylindrical sleeve wherein the spool valve forms a step portion, a gap which communicates with the space between the movable and fixed cores, and at least one opening in the body of the spool valve which communicates the interior of the spool valve with the step portion.

DETAILED DESCRIPTION OF THE PREFERRED EMBODIMENT

Figure 1:
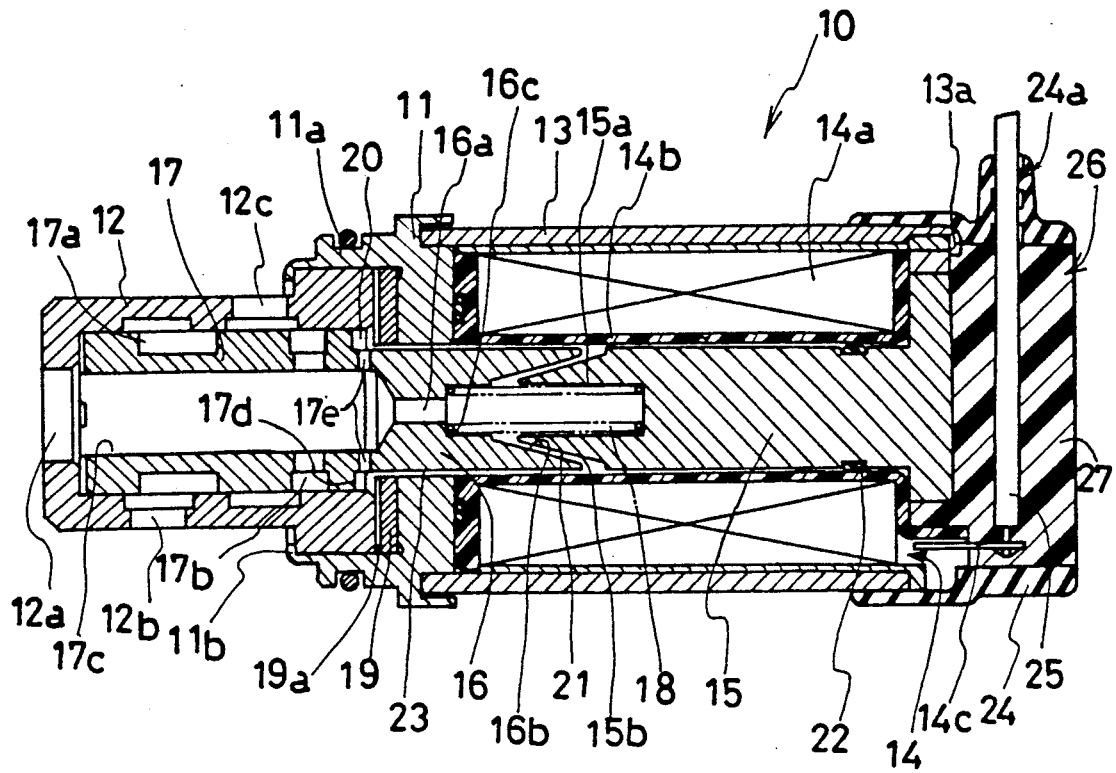
FIG. 1 represents a cross sectional view of an electromagnetic valve of the present invention.
Figure 2:
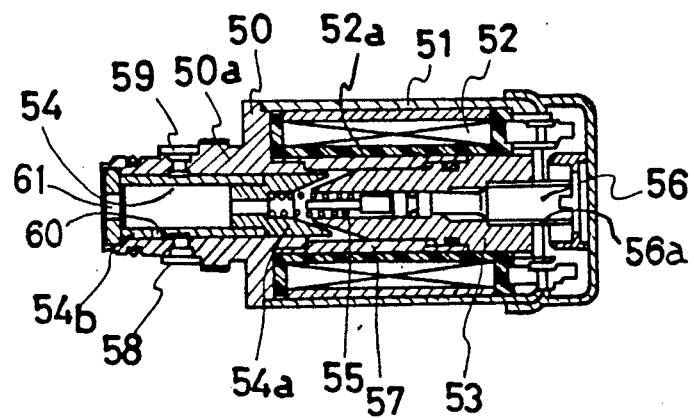
FIG. 2 represents a cross sectional view of a conventional electromagnetic valve.

In the preferred embodiment, an electromagnetic valve 10 may be used in an hydraulic control circuit of an automobile. FIG. 1 shows a cross sectional view of the electromagnetic valve 10.

Referring to the FIG. 1, an electromagnetic valve 10 basically includes a main body 11, a sleeve 12, a holder 13, an electromagnetic coil 14, a fixed core 15, a movable core 16 and a spool valve 17. The movable core 16 and the spool valve 17 are composed as one body. The electromagnetic coil 14 is comprised of a coil 14a and a coil bobbin 14b. A coil spring 18 is arranged between the fixed core 15 and the movable core 16.

The main body 11 has a cylindrical portion 11a, with an intermediate plate 19 arranged in the cylindrical portion 11a of the main body 11. The intermediate plate 19 is in the form of an annular plate, and a plurality of grooves 19a are radially formed on the surface of the intermediate plate 91. The sleeve 12 is connected to the cylindrical portion 1a of the main body 11. The sleeve 12 is tightly fixed to the holder 12 via a winding portion 11b. The sleeve 12 has a drain port 12a, an inlet port 12b and an outlet port 12c. The sleeve 12 and the cylindrically formed spool valve 17 are slidably connected along an inner portion of the sleeve 12. The spool valve 17 has a concave groove 17a and a communication hole 17b. A center hole 17c is defined at the inner portion of the spool valve 17, and communicates with the drain port 12a. In the deenergized condition of the electromagnetic valve 10, the concave groove 17a communicates with the inlet port 12b, and the communication hole 17b communicates with the outlet port 12c. A center hole 17c is formed at the center portion of the spool valve 17. The step portion 17d is defined at the edge portion of the spool valve 17. The step portion 17d is integrally formed on the outer surface of the spool valve 17. A plurality of openings 17e are formed at the junction of the spool valve 17 and movable core 16. These openings 17e communicate with the step portion 17d described above and the center hole 17c. A tiny space 20 is established between the spoon valve and the intermediate plate 19.

A center hole 16a is formed at the center portion of the movable core 16. A wedge shaped portion 16b is formed at the edge portion of the movable core 16 and a groove 16c is formed at the opening of the center hole 16a. The fixed core 15 is opposingly arranged against the movable core 16. The fixed core 15 is tightly fixed to the coil bobbin 14b. The fixed core 15 forms a wedge shaped portion 15b in alignment with the movable core 16. A predetermined gap 21 is established between the fixed core 15 and the movable core 16. The fixed core 15 has a deep groove 15a at the center portion of the fixed core 15. The coil spring 18 is arranged between the fixed core 15 and the movable core 16, and a predetermined tension is given to the coil spring 18.

The holder 13 is connected with the main body 11 via a winding portion 13b, and the fixed core 15 is fixed to the holder 13. The electromagnetic coil 14 surrounds the fixed core 15 and the movable core 16, and a sealing member 22 is arranged between the fixed core 15 and the electromagnetic coil 14 for producing a fluid tight fit. A minimum gap 23 is defined between the movable core 16 and the main body 11 and the coil bobbin 14b. The gap 23 communicates with the center hole 17c via the tiny space 20 and opening 17e. Similarly, the gap 23 communicates with the center hole 17c via the gap 21 and the center hole 16a.

A cylindrical shaped cover 24 is connected with one edge portion of the holder 13. The cover 24 is made of rubber. The current supply line 25 is electrically connected with the terminal 14c of the electromagnetic coil 14. A current supply line 25 exits the outer portion of the electromagnetic valve 10 via a hole 24a in the cover 24. A space 26 is defined in he inner portion of the cover 24, and silicon rubber 27 is filled the space 26.

The basic operation of this embodiment is similar to the conventional electromagnetic valve described earlier, that is, electrical energy causes the valve to operate by opening and closing the inlet port 12b and outlet port 12c.

As is evident from the above description, a fluid path is formed within the valve as follows. The center hole 17c communicates with gap 23 via openings 17e and the tiny space 20. The gap 23 is in connection with gap 21 and through gap 21 back into opening 17c. Thus, a fluid path is established within the valve.

In operation, if foreign matter enters the valve it will not act to jam the valve because fluid is forced through the above described fluid path when the valve is operated. This internal fluid flow acts to prevent foreign matter from building up inside the valve, and specifically in the gap between the movable core 16 and the main body 11 or the coil bobbin 14b. Thus, a significant problem of the prior art is solved.

The invention has been described in an illustrative manner, and it is to be understood that the terminology which has been used in intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

What is claimed is:

1. An electromagnetic valve comprising:
   an electromagnetic coil;
   a main body arranged adjacent to said electromagnetic coil;
   a fixed core arranged inside of said electromagnetic coil and beside said fixed core such that a space exists between said movable and fixed cores and such that a gap exists between said movable core and said electromagnetic coil, said gap communicating with said space between said movable and fixed cores;
   a cylindrical sleeve arranged on a side surface of the main body;
   a cylindrical spool valve unitary with said movable core and arranged in an inner portion of said cylindrical sleeve wherein said spool valve forms a step portion communicating with said gap on a side of said gap facing said spool valve; and
   at least one opening in the body of the spool valve which communicates the interior of said spool valve with said step portion,
   wherein said at least one opening communicates said interior of said spool valve with said gap.

2. An electromagnetic valve according to claim 1 in which an intermediate plate is arranged between said main body and said sleeve.

3. An electromagnetic valve according to claim 2 in which said intermediate plate is an annular plate with a plurality of grooves formed radially on its surface.

* * * * *